(No Model.)

M. L. NYBERG.
GAS HEATING APPARATUS.

No. 569,658. Patented Oct. 20, 1896.

WITNESSES:

INVENTOR:
Matts Leander Nyberg
by Louis Bagger & Co.
Attorneys.

THE NORRIS PETERS CO., PHOTO-LITHO., WASHINGTON, D. C.

UNITED STATES PATENT OFFICE.

MATTS LEANDER NYBERG, OF ERIE, PENNSYLVANIA.

GAS HEATING APPARATUS.

SPECIFICATION forming part of Letters Patent No. 569,658, dated October 20, 1896.

Application filed April 11, 1895. Serial No. 545,370. (No model.)

*To all whom it may concern:*

Be it known that I, MATTS LEANDER NYBERG, a citizen of the United States, and a resident of Erie, in the county of Erie and State of Pennsylvania, have invented certain new and useful Improvements in Gas Heating Apparatus; and I do hereby declare that the following is a full, clear, and exact description of the invention, which will enable others skilled in the art to which it appertains to make and use the same, reference being had to the accompanying drawings, which form a part of this specification, and in which—

Figure 1:
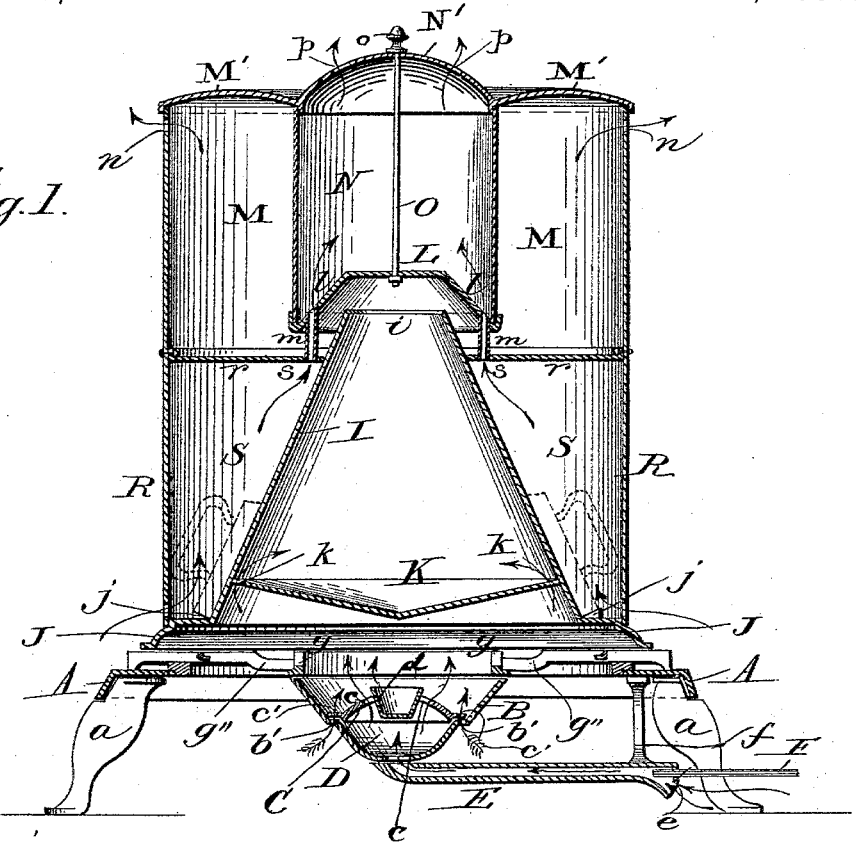
Figure 2:
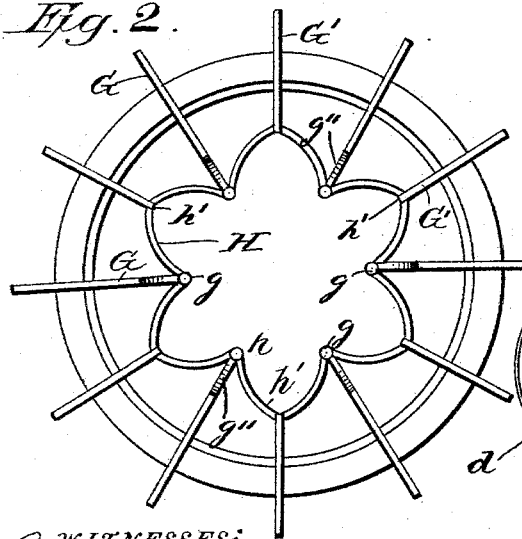
Figure 3:
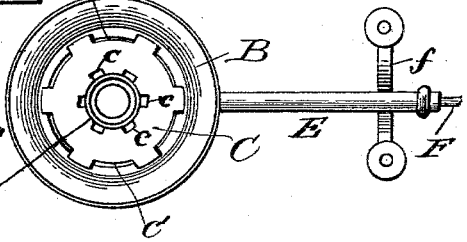

Figure 1 is a sectional view of my improved gas heating apparatus on a vertical plane through the middle thereof. Fig. 2 is a plan of the grate which forms one of the parts or elements of my improved heater, and Fig. 3 is a plan or top view of the burner and "mixer" appertaining to the apparatus.

Like letters of reference designate corresponding parts in all the figures.

This invention relates to heating apparatus, using gas as fuel, of that type which may be converted to different uses or used simultaneously for different purposes, e. g., for heating sad-irons, warming dishes, or for cooking purposes generally, the same as an ordinary gas stove or range; and my improvement consists in the novel construction and combination of the burner, grate, and so-called "mixer," or device for mixing the gas with atmospheric air before it reaches and is consumed at the burner, substantially as will be hereinafter more fully described and claimed.

On the accompanying drawings the reference-letter A denotes the frame or base of my improved gas-heater, which rests upon legs $a$ of suitable height and may contain any desired number of burners, according to the size and capacity of the apparatus; but as these burners and their adjuncts and appurtenances are all of the same construction I have shown only one of them on the drawings, with its appropriate grate, mixer, and heating attachment.

My improved burner B consists of a circular cup-shaped receptacle, the flaring sides of which have an annular horizontal flange or offset $b$, forming a ledge or shoulder upon which rests the removable concavo-convex burner-cap C. The latter, which is made of any suitable material, has a central circular opening in the crown of its arch, into which is inserted a cup or thimble $d$, the sides of which impinge upon a series of curved slots or notches $c\ c$, which alternate or "break joints" with a concentric exterior row of slots or notches $c'\ c'$ made in the outer edge or rim of cap C, and which impinge against the circular flange or shoulder $b$ of the cup B, upon which the concavo-convex burner-cap C rests, in such a manner that these exterior notches or slots $c'$ will coincide or register with corresponding apertures $b'$ in the flange $b$, through which air enters the burner from the outside, as shown by the arrows in Fig. 1.

Below the removable concavo-convex burner-cap C $d$ is the gas-chamber D, having a central aperture in its bottom connecting it with the fuel-pipe E. This pipe extends horizontally below the frame A on one side and is enlarged or widened at its outer end, so as to form a funnel-shaped inlet $e$ for the entrance of atmospheric air. A smaller pipe F is inserted into the enlarged outer end $e$ of pipe E, both pipes being kept in position by means of a hanger $f$, so that the inner end or outlet within the mouth of pipe E will be just at the point where the funnel-shaped inlet $e$ of the latter is contracted to the normal dimensions of the pipe. These two pipes E and F together form the mixer, as the gas, which is fed to the apparatus through the small pipe F, is here mixed and intermingled with atmospheric air drawn in by suction through the funnel $e$, the mixture of gas and air passing through the fuel-pipe E into the gas-chamber D of the burner. At the point of ignition more air is supplied direct from the outside through the slots or apertures $b'\ c'$ in the edge of the burner, so as to render combustion perfect.

The flaring sides of the enlarged upper part of the burner B, above its cap C, impinge against the under side of the top plate or cover of frame A, which has a circular opening A', conforming to the size of the burner covered by the grate appertaining to the same. This grate, a top view of which is represented in Fig. 2, consists of an even number (twelve on the grate shown on the drawings) of metal bars G and G', radiating from a common center, i. e., the center of the burner B, but of two different lengths—viz., one set of bars G alternating with another set of intermediate short bars G'. The inner ends of both sets of these radial grate-bars terminate in a sexfoil H, composed of a number of foils or pointed arches, with the inner end of each long bar G terminating at one of the points $h$ where the inner ends of said arches connect or impinge upon one another, while the inner ends of the intermediate short bars G' terminate at the apexes $h'$ of said foils or arches.

While the short bars or radii G' are straight their entire length, the alternating longer bars G are only straight to a point in alinement with the inner terminals $h'$ of the adjacent short bars, between which they are placed, and are from this point deflected or bent in a downward direction, as shown more clearly at $g''$ in Fig. 1, and then again continued to their terminal studs $g'$ in a straight line, so as to form an offset on a lower plane than the upper plane in horizontal alinement with the tops of the studs $g$, short bars G', and the outer part or section of the long bars G, as will be seen by reference to Fig. 1. This construction and arrangement permits the flame from the burner to find its way unobstructed under the flat bottom of a kettle, pan, or other similar culinary utensil placed upon the grate, at the edges of the same, the central part of the burner being left quite open and unobstructed on account of the arrangement of the inner ends of the radial grate-bars and the sexfoil H. By this specific construction and combination of parts I produce a grate for gas-stoves and heating apparatus using burners of similar construction which, while compact, strong, and durable in construction, is also light and neat in appearance and permits of the direct exposure to the flame from the burner of the greatest possible area of surface placed upon the grate to be heated.

The heating attachment is intended to be used for heating sad-irons, and also for the heating of dishes, cooking of meats, and other culinary purposes. It consists of a pyramidal hollow structure I, preferably made of stout sheet-iron, open at the truncated apex $i$, and having a flaring bottom J, preferably of cast-iron, which forms its hollow base and rests upon the grate, so that the open top or apex $i$ will be in vertical alinement with the center of the burner B below the base of the attachment.

The central hollow pyramid I (which is preferably four-sided, so as to simultaneously accommodate four sad-irons, one on each face) is set back a little upon its hollow base J, so as to leave a narrow ledge on all sides, on which is placed a wedge-shaped block $j$, inclining toward the adjacent face of the pyramid, so that its flat inclined top will be at right angles to the adjacent sloping side or face of the pyramid. This block $j$ forms the support or bearing for the sad-iron to be heated, the back of which is placed upon it, with the flat and smooth bottom of the iron leaning up in an inclined position against the pyramid, as shown in dotted lines.

In order to utilize the heat from the burner to the greatest possible extent, I place a disk-shaped plate K inside and near the bottom of the hollow sad-iron heater I, leaving a narrow opening $k$ all around the edge, so that the flame and products of combustion will be deflected from the burner against the inclined inner sides of the pyramid, thus subjecting them to the direct action of the heat and thereby expediting and facilitating the heating of the sad-irons placed against them on the outside.

Above the open top $i$ of the pyramidal sad-iron heater and overlapping said opening is a plate L, the edges $l$ of which are deflected, so as to form flues or passages $m\ m$ between them and the flaring top of the pyramid below. These flues deflect the products of combustion into side chambers M M, through openings $n\ n$, in the upper corners of which the products of combustion, after having given off nearly all their heat, finally escape. The plates M' may, if desired, have holes covered by removable lids, like the fire-holes of an ordinary stove or range, in which kettles, coffee-pots, or other vessels may be placed for boiling or heating their contents; or where it is not desired that the vessels should be subjected to the direct action of the heat they may be placed simply on top of the flat covers M'. Between these side compartments M M and immediately above the deflected plate L $l$ (which forms the bottom thereof) is an intermediate chamber or compartment N, which is supported upon a vertical rod O, fastened centrally upon the bottom plate L and projecting with its upper end up through the rounded top or cover N' of said middle compartment N, its projecting end being finished off with an ornamental button $o$. The heated air from the sad-iron chambers S, formed by and between the inner hollow pyramid I and its exterior casing R, with their roof-plates $r$, (which said roof-plates form the floors or bottoms of the side compartments M M,) passes up into this middle compartment or hot-air chamber N through short vertical ducts or flues $s\ s$, leading from the upper inner corners of the sad-iron chambers S S up into the lower corners of the central compartment N, as clearly shown on the drawings, the heated air escaping from compartment N out into the room through apertures $p\ p$ (arranged to be opened and closed at will) in the top N' of the compartment.

Having thus fully described my invention, I claim and desire to secure by Letters Patent of the United States—

In a gas-burner for heating purposes, the combination with the cup-shaped burner B, having a horizontally-projecting annular offset or shoulder $b$, about midway of its depth, provided with a series of apertures $b'$, and the pipes E and F, of the concavo-convex removable cap C, seated on said offset and having a series of peripheral notches $c'$, coincident with the ledge-apertures $b'$, the central nipple $d$ and a series of concentric slots $c, c$, substantially as described.

In testimony that I claim the foregoing as my own I have hereunto affixed my signature in presence of two witnesses.

MATTS LEANDER NYBERG.

Witnesses:
ISADOR SOBEL,
JOHN KJELLIN.